United States Patent [19]
Hug et al.

[11] Patent Number: 4,526,313
[45] Date of Patent: Jul. 2, 1985

[54] SOLDER WAVE APPARATUS AND METHOD

[75] Inventors: Paul Hug, Saratoga; Antonio Tavares, San Jose, both of Calif.

[73] Assignee: Storage Technology Partners, Louisville, Colo.

[21] Appl. No.: 477,798

[22] Filed: Mar. 22, 1983

[51] Int. Cl.³ .............................................. B23K 1/08
[52] U.S. Cl. .................................. 228/180.1; 228/37
[58] Field of Search ................ 228/180 R, 37, 180 A, 228/36; 118/429; 427/96

[56] References Cited

U.S. PATENT DOCUMENTS

| | | | |
|---|---|---|---|
| 3,752,383 | 8/1973 | Allen et al. | 228/36 X |
| 3,824,954 | 7/1974 | Hyosaka et al. | 118/429 |
| 3,989,180 | 11/1976 | Tardoskegyi | 228/180 R |
| 4,208,002 | 6/1980 | Comerford et al. | 228/37 |
| 4,315,590 | 2/1982 | Kondo | 118/429 X |

*Primary Examiner*—Nicholas P. Godici
*Assistant Examiner*—M. Jordan
*Attorney, Agent, or Firm*—Bryant R. Gold

[57] ABSTRACT

An improved solder wave apparatus and method that minimizes the undesirable phenomenon of solder splash is presented. A V-shaped trough is placed across the top of the inner container or box of an otherwise conventional solder wave machine. The V-shaped trough is positioned so that the bottom thereof is lower than the lowest side wall or walls of the inner container. A hole in the bottom at a first end of the trough allows molten solder to enter therein. A dam is placed along the length of the trough and divides the trough into the first and second sections. The dam includes a hole at the bottom to allow molten solder to pass from the first section into the second section. A slot or opening placed in the side wall of the inner container above a second end of the trough allows the molten solder to fall back into an outer container of the solder wave machine, from which location the solder is pumped back into the inner container in conventional fashion. Articles to be tinned with the molten solder are dipped thereinto in the second section of the trough, the undesirable solder splash phenomenon having already occurred, if at all, while the molten solder was held in the first section of the trough.

7 Claims, 4 Drawing Figures

SOLDER WAVE APPARATUS AND METHOD

BACKGROUND OF THE INVENTION

This invention relates to the tinning of the leads of an IC package with solder from a solder wave to prepare them for soldering to a printed circuit board or the like. More particularly, the invention relates to an improved solder wave apparatus that eliminates the undesirable "solder splash," characteristic of solder waves, which "solder splash" can cause electrical shorts between the traces or leads of an IC package.

An integrated circuit chip is typically a rectangle of processed silicon with dimensions on the order of a tenth of an inch. In order to test and use the chip, it is placed in an IC package, wires are bonded between the input/output pads of the chip and the leads of the IC package, and the chip is sealed within the package in some manner.

The packaged IC is then tested and affixed to the next level of packaging, typically a printed circuit board, for its intended use. If the number of leads on the IC package is small, it is usually affixed to the printed circuit board by inserting the leads of the package through plated holes provided on the printed circuit board and soldering the leads to the plated holes.

As the number of leads on an IC package is increased, the leads, by necessity, become smaller and more easily damaged by handling. IC packages with a large number of leads are typically affixed to the printed circuit board by lap soldering the leads of the package to pads on the board. Advantageously, the manufacturing process associated with lap soldering techniques allows each lead to be aligned with the pad to which it is to be soldered, without damaging the lead, before the lap soldering process takes place. In the case of removal of the packaged IC, special tooling is used to unsolder all of the leads at once so that the package can be removed without damaging the leads of the package or the pads on the printed circuit board.

IC packages which are lap soldered are typically fabricated with their leads gold plated. This is done because a solder plate on the leads has a definite "shelf life", i.e., solder plate will oxidize over a period of time and, if oxidized, the leads of the package may not lap solder properly because of the oxidation. Also, it is difficult to plate enough solder on the leads to provide the amount of solder necessary for the lap soldering process.

At some point in the manufacturing process, prior to the lap soldering process, the gold plated leads of the IC package are "tinned". This is usually done by momentarily dipping the leads in a solder wave of a solder wave machine. The molten solder from the solder wave adheres to the gold plated leads and provides enough solder for each lead to be lap soldered to the pads on the printed circuit board.

An undesirable characteristic of a solder wave is that as the surface of the wave is exposed to the atmosphere, globules of molten solder leap out of the wave. This phenomenon is called "solder splash". The solder splash is flung into the air only an inch or so, but the globules can strike the exposed gold traces of the IC package, above the leads being tinned, and cause electrical shorts between the traces. When this occurs, the electrical shorts must be removed by removing the adhering solder splash.

The existance of solder splash significantly adds to the manufacturing cost of the packaged IC. This is because, first, the electrical shorts must be found; and secondly, they must be removed. Various schemes have been devised to find such electrical shorts, such as continuity checking between the leads after they have been tinned; but in some cases, the number of electrical shorts, and the expense of trying to remove them, can be so great as to cause the package to be discarded rather than attempting to remove the shorts.

The present invention provides an improved apparatus that eliminates the solder splash from the solder wave so that the troublesome and expensive electrical shorts do not occur. The result is a significant reduction in the time and cost of the IC packaging process.

SUMMARY OF THE INVENTION

It is an object of the present invention to provide an improved solder wave apparatus that supplies oxide-free molten solder to be used for tinning the leads of IC packages in preparation for soldering them on printed circuit boards.

It is a further object of the present invention to provide such an improved solder wave apparatus wherein the solder used for IC lead tinning is free from the phenomenon known as "solder splash."

The above and other objects of the present invention are realized in an embodiment of a solder wave apparatus that includes a special trough mounted so as to receive molten solder from the wave of an otherwise conventional solder wave of an otherwise conventional solder wave machine. This special trough is divided into two sections. A first section holds a known volume of the agitated molten solder from the solder wave a sufficient time so as to allow the phenomenon of "solder splash" to occur, if it is to occur at all. The molten solder is then passed into a second section of the trough wherein solder splash will not occur. The IC leads may then be dipped into the molten solder held in the second section without concern of having solder splash cause undesirable electrical shorts.

BRIEF DESCRIPTION OF THE DRAWINGS

The above and other objects, features, and advantages of the present invention will be more apparent from the following more particular description of the invention presented in connection with the accompanying drawings, wherein.

DETAILED DESCRIPTION OF THE INVENTION

The following is a description of the best presently contemplated mode of carrying out the present invention. This description is given only for the purpose of illustrating the principles involved and is not to be taken in a limiting sense. The proper scope of the present invention can be ascertained by referring to the appended claims.

Figure 1:
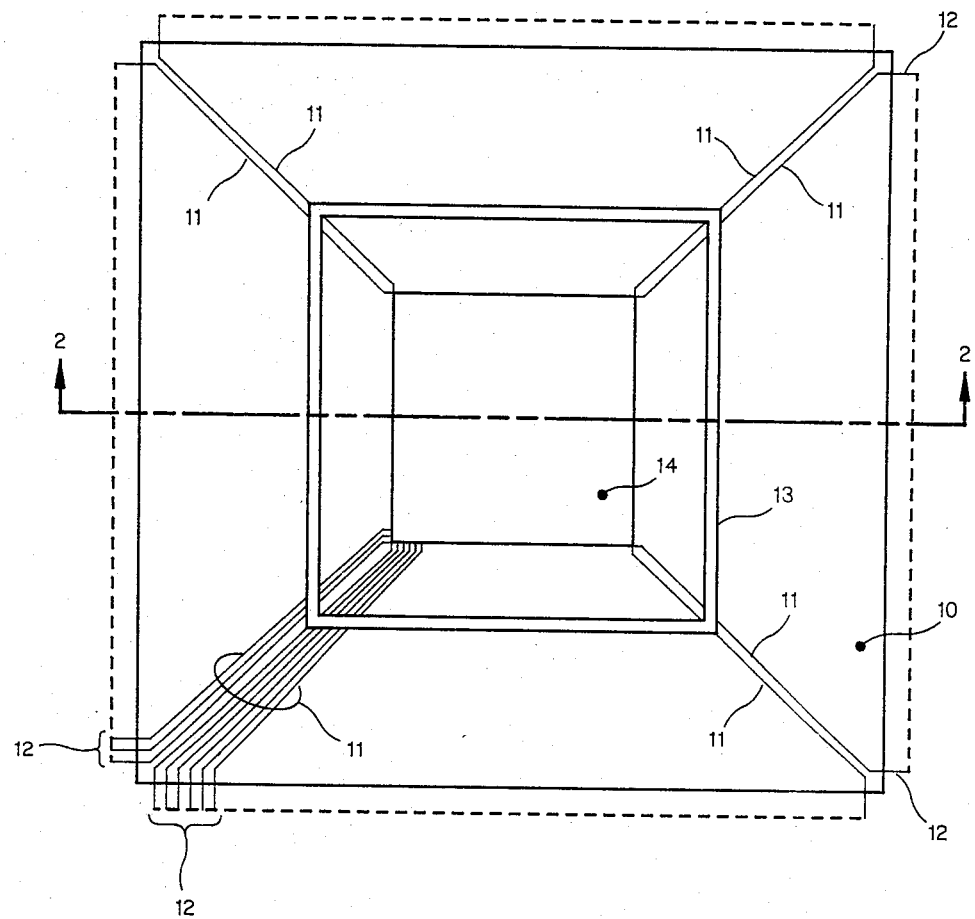
FIG. 1 is a top plan view of a typical IC package having a large number of leads that require tinning with molten solder.
Figure 2:
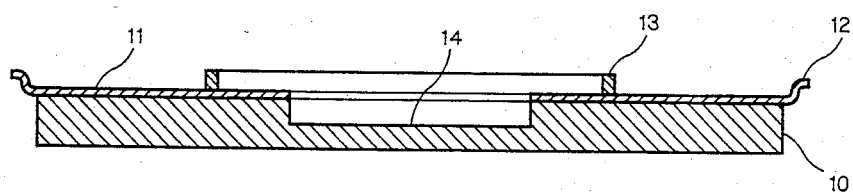
FIG. 2 is a cross sectional view of the IC package of FIG. 1 taken along the line 2—2.

To better understand the need for and contemplated use of the present invention, it will be helpful to first review the layout of a typical IC package. FIG. 1 is a plan view of such a typical IC package, and FIG. 2 is a cross sectional view thereof. The body 10 of the package is a ceramic material and has a cavity 14 in which the integrated circuit chip is mounted. A multiplicity of metal traces 11, shown as lines in FIG. 1, are deposited on surface of the body 10 between the outer edge of the cavity 14 and the outer edge of the body. (Only a few of these traces 11 are actually shown in FIG. 1, for simplicity, but in practice such traces occupy much of the surface area of the body 10.) At the outer edge of the body 10, leads 12 are attached to the traces. Surrounding the cavity 14 is an annular raised surface 13 to which a lid (not shown) is attached to seal the chip within the cavity.

Typically, the leads 12, traces 11, the surface of the cavity 14, and annular surface 13 are all plated with a very thin layer of gold, or equivalent conductive nonoxidizable substance. The integrated circuit chip is soldered to the gold surface of the cavity 14 and very thin wires are bonded between the input/output pads of the chip and the ends of the traces 11 around the cavity 14.

The traces 11 fan out from the cavity 14 to the outer edge of the body 10, as indicated by the traces shown in the lower left-hand corner of FIG. 1. As they fan out, the width of the traces increases so that at the outer edge, they are wide enough to have the lead 12 attached. In a typical VLSI embodiment, for example, there may be sixty-four traces along each side of the package. The traces 11 are 0.004 inches wide with a 0.004 inch space between them at the edge of the cavity 14; and 0.010 inches wide with a 0.010 inch space between them at the outer edge of the body 10.

Figure 3:
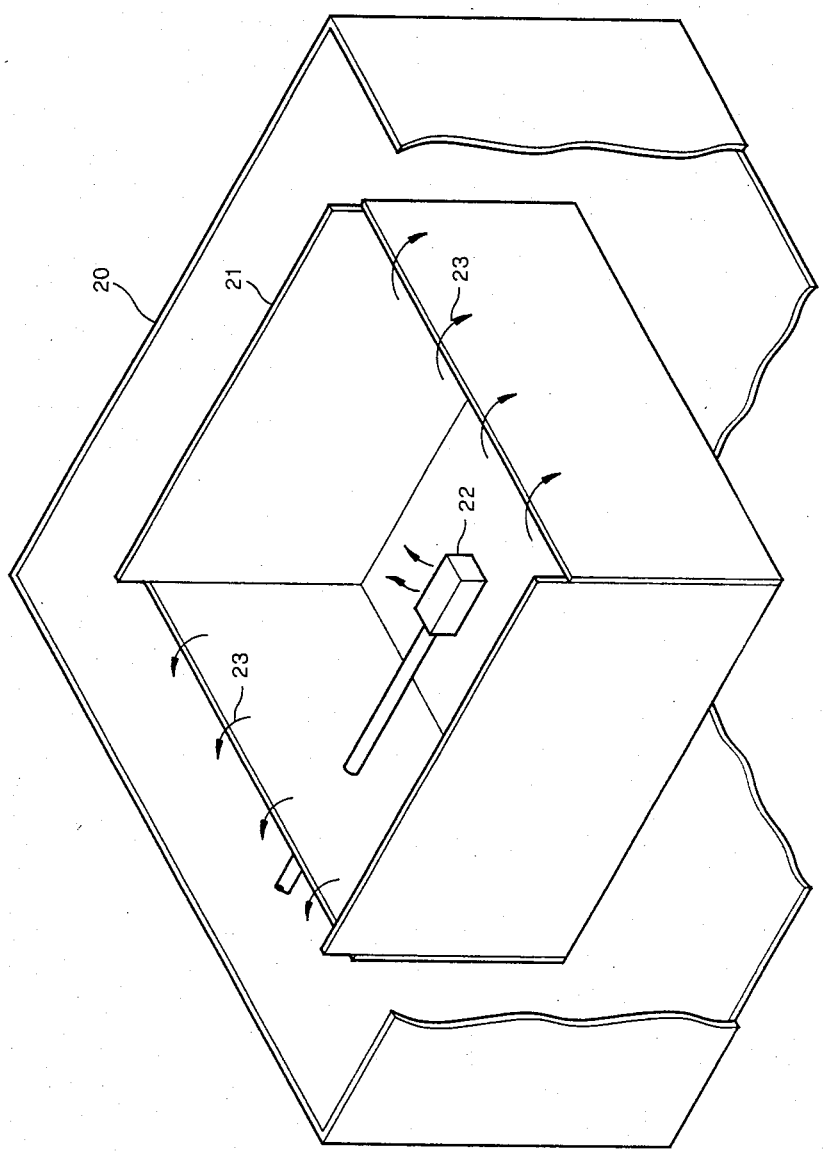
FIG. 3 is a perspective view of a conventional solder wave machine with a portion thereof cutaway.

FIG. 3 is a perspective view of a conventional solder wave machine, a portion of which is cutaway. The machine consists of four basic elements: an outer box or container 20, an inner box or container 21, a solder pump 22, and electrical heaters (not shown).

In use, the inner box 21 and the outer box 20 both contain solder which is kept in a molten state by the electrical heaters. The pump 22, driven by an electric motor (also not shown), pumps molten solder from the lower region of the outer box 20 into the lower region of the inner box 21. This pumped solder eventually fills up the inner box 21. Once full, the molten solder flows over two opposite edges of the inner box 21 as a "solder wave" back into the outer box 20. The solder wave is represented in FIG. 3 by the arrows 23.

Without the pump, the entire surface of the molten solder in both the inner box 21 and outer box 20 would be covered with a film of oxide. This is because the molten solder, at a temperature of over 460 degrees Fahrenheit, reacts very quickly with the oxygen in the air to form the oxide. With the pump, however, the surface of the wave is continuously being changed with fresh molten solder and the oxide does not have a chance to form. The only oxide that forms is on the surface of the outer box 20 around the edges where the surface of the solder is not being changed. As mentioned previously, oxide is a contaminant in the soldering process that can cause weak or faulty solder bonds. Once the solder wave is regularly flowing from the inner box 21 to the outer box 20, the leads of the IC package can be readily tinned by dipping them in the oxide-free solder of the wave to solder coat all the leads on one side of the package at the same time.

As referenced above, a solder wave unfortunately has solder splash associated therewith. The cause of solder splash is not fully understood, although it appears to be caused by the instantaneous cooling of the continuously changing surface of the wave as it is exposed to the atmosphere.

When an IC package of the type shown in FIG. 1 is having its leads tinned in a conventional solder wave machine, globules of the solder splash may land anywhere on the package. If these globules land on the traces 11 (see FIG. 1), the globules, which are still molten, will combine with the gold plating of the trace and become attached to the trace. Since, as explained above, the spacing between the traces is only a few thousandths of an inch, a globule of solder splash can bridge several traces, causing an electrical short therebetween.

Figure 4:
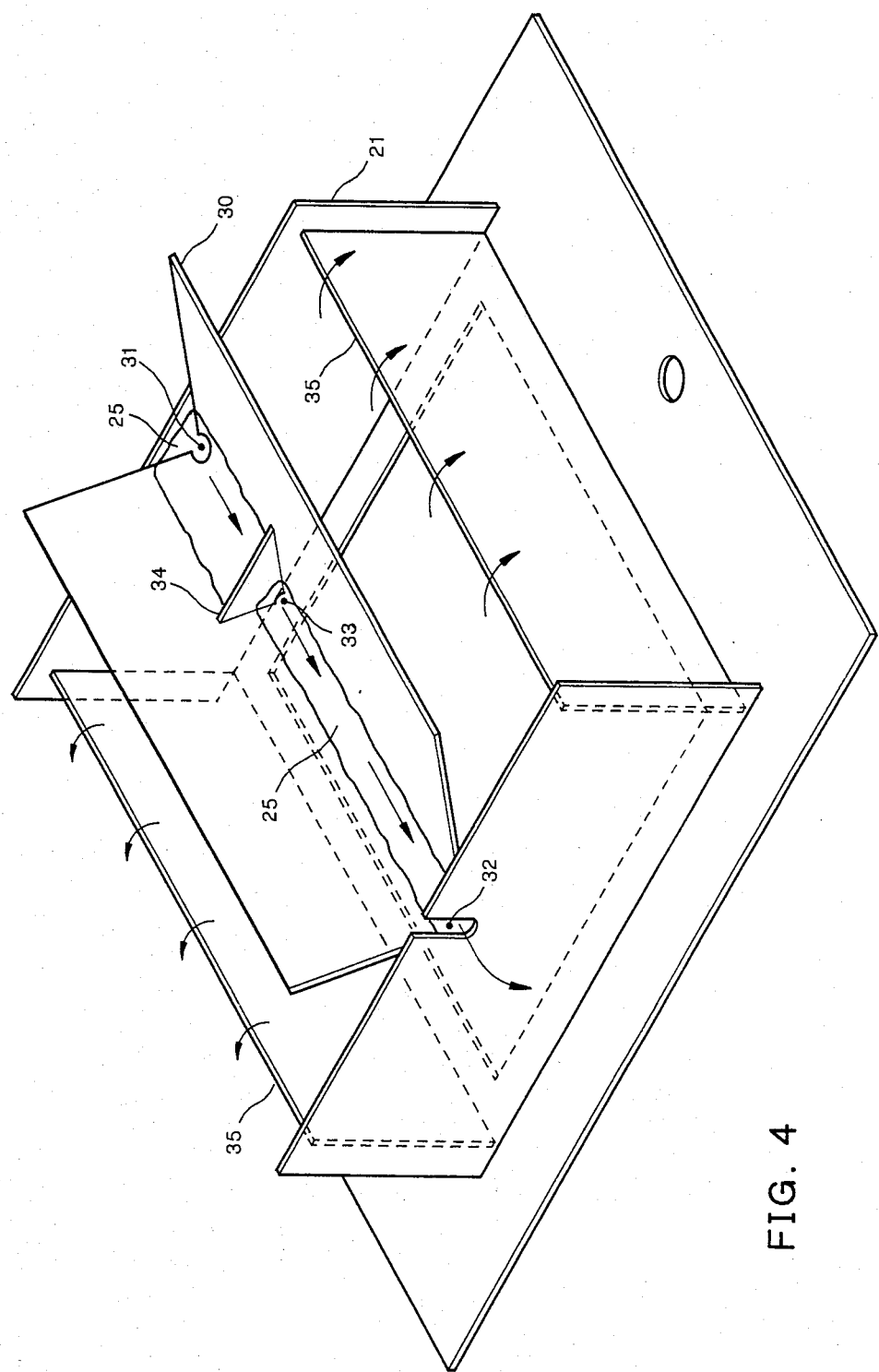
FIG. 4 is a perspective view of the present invention as mounted to the inside section of the solder wave machine of FIG. 3.

FIG. 4 is a perspective view of the improved solder wave apparatus of the present invention. The improvement comprises a V-shaped trough 30 that is mounted within the inner box 21 of a solder wave machine. (The outer box 20 is not shown in FIG. 4, but would be the same as FIG. 3.) The bottom of the trough 30 is positioned to lie below the top level of the solder wave, that is, below the top edges 35 of the lowest walls of the box 21. If desired, the V-shaped trough 30 may be mounted so as to have a slight inclination associated therewith, thereby allowing gravity to cause solder to flow from one end to the other. A hole 31 is drilled in the bottom of the V-trough 30 at one end. Since the bottom of the V-trough 30 is below the top level of the molten solder wave, the molten solder 25 will also be forced into the V-trough 30 through this hole. At the other end of the V-trough 30, a slot 32 is cut in the side of the inner box 21. Thus, solder 25 that is forced into the V-trough 30 through the hole 31 is returned to the outer box through the slot 32.

A small dam 34 is attached at an appropriate location along the length of the V-trough 30. The dam 34 has a small hole 33 located at the bottom thereof. The size of the V-trough 30, its depth within the solder wave, the height of the dam 34, the size of the holes 31 and 33, and the size of the slot 32 are all designed such that the volume of solder held in that section of the V-trough 30 between the hole 31 and the dam 34 does not fill up with solder and flow over the dam. Further, the volume of solder flowing through that section of the V-trough 30 between the dam 34 and slot 32 has a sufficient depth associated therewith to allow the leads of an IC package to be readily tinned therein.

As mentioned previously, the exact cause of "solder splash" is not understood, but it is believed to be caused by the instantaneous cooling of the solder of the wave as it encounters the atmosphere. The present invention eliminates solder splash by providing a first volume of solder, i.e., that volume held in the V-trough 30 between the hole 31 and the dam 33, wherein the solder may "relax". That is, upon entering this section, the solder is in what may be called an "agitated" state, and solder splash occurs at the surface of this agitated solder. By allowing the solder to pass through the hole 33 in the bottom of the dam 34 into the section of the V-trough 30 between the dame 34 and the slot 32, the solder attains what may be called a "relaxed" state. In this state, the phenomenon of solder splash does not occur, and the leads of IC packages can be readily tinned in this second volume of solder held in the second section of the trough 30 without electrical shorts being caused by solder splash.

Hence, there has been disclosed herein an improvement to an otherwise conventional solder wave machine that allows tinning of IC leads or the like to occur in a volume of solder wherein solder splash does not occur. The use of such an improved solder wave apparatus thereby significantly improves the yield associated with IC lead tinning, or similar operations; thereby significantly reducing the cost of a given manufacturing process.

What is claimed is:

1. A method of tinning an article, such as the leads of an integrated circuit package, with molten solder with a minimum occurrence of solder splash, said method comprising the steps of:
   (a) circulating molten solder between an outer and inner container by pumping the molten solder from the outer container to a location more or less centered at the bottom of the inner container, whereby the molten solder may fall back into the outer container as a wave over the top of the lowest wall or walls of the inner container once the inner container is full;
   (b) including in the circulation path of said molten solder a trough divided into the first and second sections, said molten solder entering said first section first and then being passed on to said second section, comprising the steps of:
      (1) placing said trough across the top of said inner container, the bottom of said trough being positioned so as to be lower than the top of the lowest wall of said inner container;
      (2) inserting a hole in the bottom of a first end of said trough;
      (3) placing a dam at a selected location along the length of said trough, said dam comprising the separation between said first and second sections of said trough, and said dam including means for allowing said molten solder to pass from said first section into said second section; and
      (4) inserting an opening in the side wall of said inner box above a second end of said trough, whereby the molten solder flowing through said second section may pass through said opening and fall back into said outer container; and
   (c) dipping said article into said molten solder as said solder flows through the second section of said trough.

2. The method as defined in claim 1 wherein said trough is positioned so as to have a slight inclination associated therewith so as to allow the force of gravity to enhance the flow of solder from the first end of said trough to the second end of said trough.

3. An improved solder wave apparatus comprising an outer container having an open top; an inner container also having an open top and placed inside of said outer container; heating means for maintaining solder placed in said outer and inner containers in a molten state; and pumping means for pumping said molten solder from the outer container to a central location within said inner container, the improvement of which comprises:
   a trough positioned across the top of said inner container, the bottom of said trough being lower than the top of the lowest side walls of said inner container, said trough having a cross-sectional V-shape;
   first fluid communication means at one end of said trough for allowing molten solder contained in said inner container to enter said trough, said first fluid communication means comprising a first opening of select dimensions positioned at the bottom tip of said V-trough;
   second fluid communication means at the other end of said trough for allowing molten solder held in said trough to return to said outer container, said second fluid communications means comprising a second opening in the side wall of said inner container positioned above the bottom tip of said V-trough, whereby molten solder flowing through said V-trough may pass through said second opening and fall back into said outer container; and
   separation means for separating said trough into first and second sections, said separation means including third fluid communication means for allowing molten solder to pass from said first to said second sections;
   whereby molten solder from said inner container enters said trough through said first fluid communication means, is held in said first section, passes from said first section to said second section through said third fluid communication means, and flows through said second section back into said outer container through said second fluid communication means, the flow of said molten solder through said second trough section providing a region where articles to be tinned by said molten solder, such as integrated circuit leads, may be readily dipped into said molten solder without the occurrence of undesirable solder splash.

4. The apparatus as defined in claim 3 wherein said separation means comprises a dam selectively placed along the length of said V-trough, and wherein said third fluid communication means comprises a third opening of a select size placed in the bottom of said dam.

5. The apparatus as defined in claim 4 wherein the sizes of said first and third openings are selected so that a known volume of molten solder is held in said first trough section, and a known solder flow is allowed to pass through said dam into said second section, said known solder flow being of sufficient depth to allow the articles to be tinned to be readily dipped into the molten solder flowing through said second section of said trough.

6. A solder wave apparatus comprising:
   a first box having an open top;
   a second box having an open top placed inside of said first box, said second box having a trough placed across the top thereof;
   heating means for maintaining solder placed in said outer and inner boxes in a molten state;
   pumping means for circulating said solder between the outer to the inner box; and
   means for allowing the circulating molten solder to enter and flow through said trough;
   said trough being divided into first and second sections, said trough having a cross-sectional shape that is V-shaped, the bottom of said trough being positioned lower than the top of the lowest wall of said inner box, and wherein a hole is located in the bottom of the first section of said trough, and an opening is located in the side wall of said inner box at the end of the second section of said trough above the bottom tip of said V-trough, whereby molten solder may flow into said first section of said trough from the inner box, and flow out of the second section of said trough into the outer box, and wherein solder splash associated with the molten solder flowing through said trough occurs, if at all, in said first section;

whereby an article to be tinned by said molten solder may be dipped into the molten solder as it flows through said second section of said trough.

7. The solder wave apparatus as defined in claim 6 wherein a dam is located in said trough to separate said first and second sections, said dam having means for allowing the molten solder to pass from the first section to the second section.

* * * * *